US012583173B2

(12) United States Patent
Oh et al.

(10) Patent No.: US 12,583,173 B2
(45) Date of Patent: Mar. 24, 2026

(54) INKJET-TYPE 3D PRINTING METHOD USING UREA REACTION

(71) Applicant: 3DMATERIALS CO., LTD., Anyang-si (KR)

(72) Inventors: Jung Hyun Oh, Daejeon (KR); Eun Jeong Hahm, Seoul (KR); Jin A Kim, Daejeon (KR)

(73) Assignee: 3DMATERIALS CO., LTD., Anyang-si (KR)

( * ) Notice: Subject to any disclaimer, the term of this patent is extended or adjusted under 35 U.S.C. 154(b) by 142 days.

(21) Appl. No.: 18/549,108

(22) PCT Filed: Dec. 8, 2021

(86) PCT No.: PCT/KR2021/018546
§ 371 (c)(1),
(2) Date: Sep. 5, 2023

(87) PCT Pub. No.: WO2022/191381
PCT Pub. Date: Sep. 15, 2022

(65) Prior Publication Data

US 2024/0157630 A1 May 16, 2024

(30) Foreign Application Priority Data

Mar. 9, 2021 (KR) ........................ 10-2021-0030639

(51) Int. Cl.
*B29C 64/112* (2017.01)
*B29C 64/209* (2017.01)
(Continued)

(52) U.S. Cl.
CPC .......... *B29C 64/112* (2017.08); *B29C 64/209* (2017.08); *B29C 64/245* (2017.08);
(Continued)

(58) Field of Classification Search
CPC ... B29C 64/112; B29C 64/209; B29C 64/245; B29C 64/336; B29C 64/364; B33Y 10/00; B33Y 70/00; B29K 2075/02
See application file for complete search history.

(56) References Cited

U.S. PATENT DOCUMENTS

2005/0093208 A1* 5/2005 Boyd .................... B29C 64/112 264/494
2015/0353750 A1* 12/2015 Titterington ......... C09D 133/14 264/308
(Continued)

FOREIGN PATENT DOCUMENTS

JP 2016-112823 A 6/2016
JP 6374034 B2 8/2018
(Continued)

OTHER PUBLICATIONS

International Search Report and Written Opinion mailed Mar. 18, 2022, issued in International Patent Application No. PCT/KR2021/018546, filed Dec. 8, 2021, 12 pages.

*Primary Examiner* — Jerzi H Moreno Hernandez
(74) *Attorney, Agent, or Firm* — Christensen O'Connor Johnson Kindness PLLC

(57) ABSTRACT

The present invention provides an inkjet-type 3D printing method using a urea reaction capable of quickly printing a large-area 3D structure regardless of a size of a printed matter by printing a 3D structure on a surface of a subject ink applied in units of layers through the urea reaction between a hardener ink and the subject ink applied by an inkjet method while omitting a separate supporter structure for supporting an overhang portion of the 3D structure to be printed during 3D printing by using, as the subject ink, a phase change ink composition ink that exists in a liquid phase at room temperature but is frozen and gelled at a certain temperature or lower.

9 Claims, 2 Drawing Sheets

(51) Int. Cl.

| | |
|---|---|
| ***B29C 64/245*** | (2017.01) |
| ***B29C 64/336*** | (2017.01) |
| ***B29C 64/364*** | (2017.01) |
| ***B33Y 10/00*** | (2015.01) |
| ***B33Y 70/00*** | (2020.01) |
| *B29K 75/00* | (2006.01) |

(52) U.S. Cl.

CPC .......... *B29C 64/336* (2017.08); *B29C 64/364* (2017.08); *B29K 2075/02* (2013.01); *B33Y 10/00* (2014.12); *B33Y 70/00* (2014.12)

(56) References Cited

U.S. PATENT DOCUMENTS

| | | | | |
|---|---|---|---|---|
| 2021/0016506 | A9* | 1/2021 | Leibig | B29C 64/118 |
| 2021/0187823 | A1* | 6/2021 | Macor | B29C 64/112 |
| 2022/0204761 | A1* | 6/2022 | Kuno | B33Y 70/00 |
| 2024/0166905 | A1* | 5/2024 | Oh | B33Y 10/00 |

FOREIGN PATENT DOCUMENTS

| | | | | |
|---|---|---|---|---|
| JP | 2019-188815 | A | 10/2019 | |
| KR | 10-2019-0090846 | A | 8/2019 | |
| WO | WO-2015190168 | A1 * | 12/2015 | B33Y 10/00 |
| WO | WO-2021137450 | A1 * | 7/2021 | |

* cited by examiner

[FIG. 1]
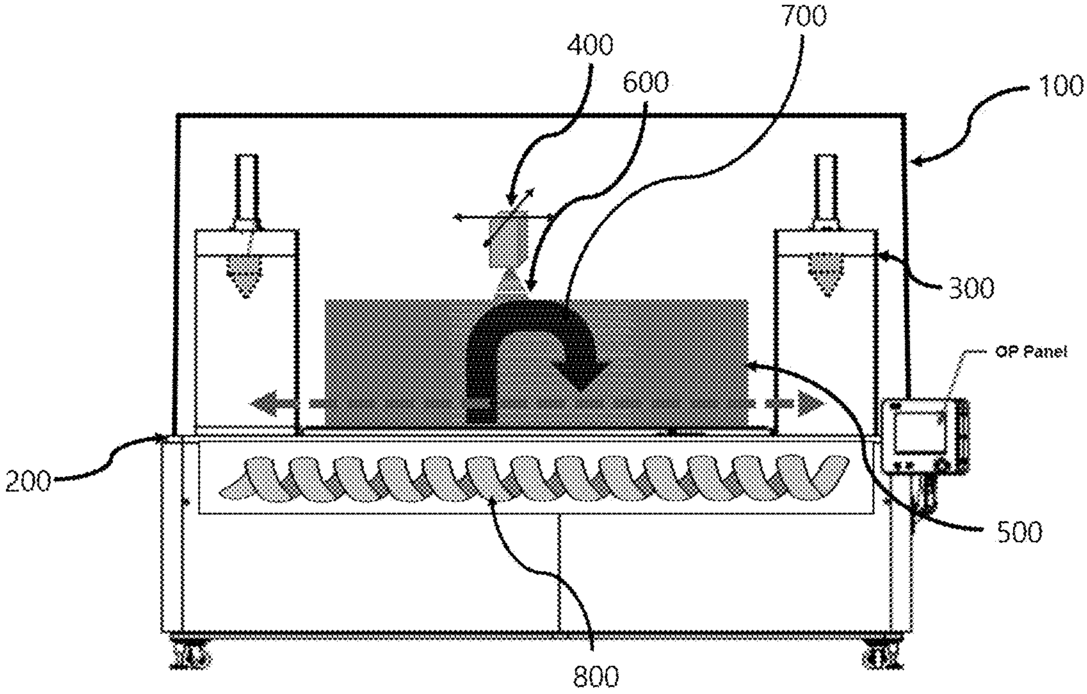
[FIG. 2]
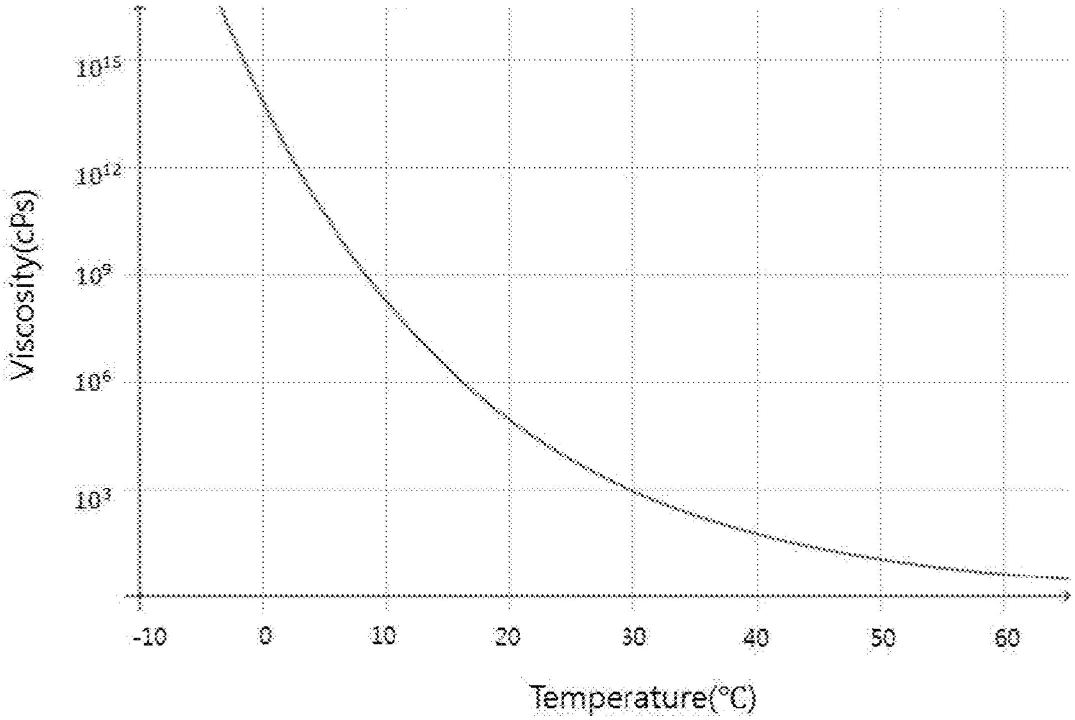

[FIG. 3]
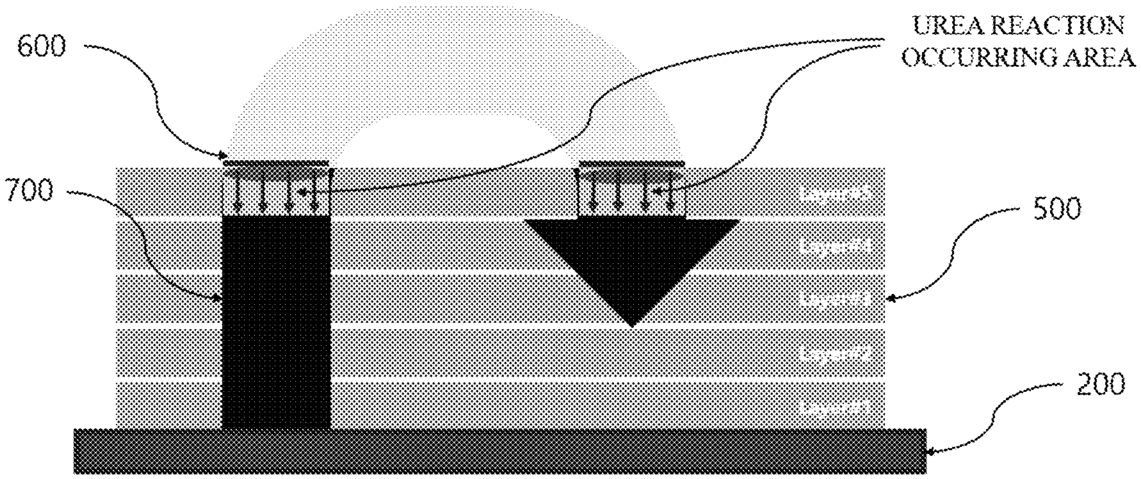

INKJET-TYPE 3D PRINTING METHOD USING UREA REACTION

TECHNICAL FIELD

The present invention relates to an inkjet-type 3D printing method using a urea reaction, and more particularly, to an inkjet-type 3D printing method using a urea reaction capable of quickly printing a large-area 3D structure regardless of a size of a printed matter by printing a 3D structure on a surface of a subject ink applied in units of layers through the urea reaction between a hardener ink and the subject ink applied by an inkjet method while omitting a separate supporter structure for supporting an overhang portion of the 3D structure to be printed during 3D printing by using, as the subject ink, a phase change ink composition ink that exists in a liquid phase at room temperature but is frozen and gelled at a certain temperature or lower.

BACKGROUND ART

Recently, the 3D printing industry itself is rapidly establishing as a new industry, and is actively expanding the scope of application in each industry. The 3D printing, also called additive manufacturing (AM), refers to a process of manufacturing three-dimensional objects by stacking materials using digital design data. The conventional manufacturing technology for three-dimensional objects was mainly a subtractive manufacturing type that produces three-dimensional objects by cutting or shaving three-dimensional materials through mechanical processing, but the 3D printing takes a method of producing three-dimensional objects by stacking printing materials step by step.

As such a 3D printing method, a stereolithography (SLA) method disclosed in Korean Patent Laid-Open Publication No. 10-2018-0125910, a laser sintering (SLS) method disclosed in Korean Patent Laid-Open Publication No. 10-2018-0076951, or the like is used. In addition, various methods such as a molten deposition modeling (FDM) method or a multi-jet modeling (MJM) method are applied and used.

However, in producing printed matters through such a 3D printing method, whatever method is applied, due to the nature of the printing process, when an overhang portion is present in shapes of three-dimensional objects to be printed, that is, printed matters, a supporter structure for supporting the overhang portion is required. To this end, in the conventional 3D printing process, the supporter for supporting the overhang portion generated during the formation of the printed matters is printed with the printed matter, and after the printing process is completed, the process of removing the supporters attached to the printed matters through the post-processing process is essential, which is a major factor of not only increasing and complicating the entire working process, but also consuming raw materials for supporter printing to increase the overall production costs.

In order to solve this problem, Korean Patent Laid-Open Publication No. 10-2019-0179632 filed by the applicant of the present invention discloses a 3D printing method that uses a phase change ink composition ink that exists in a liquid phase at room temperature but is frozen and gelled at a certain temperature or lower to be able to omit a separate supporter structure for supporting an overhang portion of a 3D structure to be printed through a photocuring printing process in a low temperature environment.

However, as described above, the above-described Patent No. 179632 prints a 3D structure through a photocuring method, which is basically applied to 3D printing of a general SLA method. Such a photocuring printing method has the advantage of being able to provide relatively high printing precision and high printing speed, but has a problem in that many restrictions are followed in printing large-sized printed matters.

That is, the above-described Patent No. 179632 discloses that, due to the nature of the photocuring printing method, the 3D structure is printed through a process of selectively curing an ink composition applied in units of layers through light irradiation by using a laser beam, digital light processing (DLP), a liquid crystal display (LCD), or the like. In this case, the above-described Patent No. 179632 has a disadvantage that it is not suitable for printing the printing large-sized printed matters due to the structural limitations in the light irradiation process.

In other words, in the case of using the laser beam, due to the nature of the point source, there is a disadvantage in that, in printing the large-sized printed matters, a printing time required per layer becomes excessively long and the overall printing speed becomes very slow, and in the case of using the DLP or the LCD, since the precision of the printed matters is determined by a pixel size of the LCD panel or the DLP, there is a limit to precisely printing the large-area printed matters. In addition, in order to solve this problem, a method of connecting and using a plurality of LCD panels is sought, but in that case, the probability that the structural defects of the printed matter, such as cracks, occur at a connection part of the LCD panel increases, so there is a limitation that it is difficult to guarantee structural integrity of large-area printed matters.

In addition, as described above, as the SLA-type 3D printing technology has limitations in printing the large-area printed matters, recently, an inkjet-type 3D printing technology of spraying an ink composition in a desired shape through an inkjet nozzle and immediately solidifying and printing the sprayed ink composition through a photocuring or thermal curing process has been attempted.

However, the inkjet-type 3D printing using the photocuring or thermal curing solves the problem of limiting a size of a printed matter through an inkjet nozzle driving method using a 2-D actuator, but has limitations in an ejection speed of an ink composition ejected through an inkjet nozzle and thus has the disadvantage of slow printing speed, and has a problem in that it is difficult to use an oligomer or polymer composition having a high molecular weight because an ink composition to be sprayed requires a low viscosity of several tens of cPs or less in order to spray the ink composition through a nozzle.

In addition, as in the conventional 3D printing methods described above, such a conventional inkjet-type 3D printing still has the problem of printing and removing a supporter for supporting an overhang portion of a printed matter.

DISCLOSURE

Technical Problem

The present invention is to solve the problems appearing in the above-described conventional 3D printing method, and the present invention provides an inkjet-type 3D printing method capable of quickly printing a large-area 3D structure regardless of a size of a printed matter by printing a 3D structure on a surface of a subject ink applied in units of layers through the urea reaction between a hardener ink and the subject ink applied by an inkjet method while omitting a separate supporter structure for supporting an overhang portion of the 3D structure to be printed during 3D printing by using, as the subject ink, a phase change ink composition ink that exists in a liquid phase at room temperature but is frozen and gelled at a certain temperature or lower.

Technical Solution

In an aspect of the present disclosure, an inkjet-type 3D printing method of printing a 3D structure using a urea reaction between amine and isocyanate includes: applying a subject ink made of a high molecular oligomer or a high polymer containing an amine group (—$NH_2$) or an isocyanate group (—NCO) on at least one end on a build platform in units of layers to a certain thickness by a slot coating method; spraying a hardener ink made of a monomer or an oligomer containing the isocyanate group (—NCO) or the amine group (—$NH_2$) on at least one end according to patterns set in advance for each layer according to a shape of a 3D structure to be manufactured to a surface of the subject ink applied in the units of layers through an inkjet nozzle and curing a 3D structure layer through cross-linking by the urea reaction between amine and isocyanate contained in the subject ink and the hardener ink, respectively; and applying the subject ink on the layer cured by the urea reaction in the units of layers again, repeatedly curing the 3D structure layer by spraying the hardener ink through the inkjet nozzle, and printing the 3D printed matter in which the layers cured through the cross-linking by the urea reaction are stacked, in which the subject ink is made of a low-temperature phase change ink composition that is maintained in a liquid state at the room temperature and is frozen and gelled at a low temperature equal to or lower than a certain phase change temperature, the printing of the 3D structure is configured to be performed in a low temperature chamber in which a low-temperature environment equal to or lower than the phase change temperature is maintained, and the 3D printed matter stacked and printed through the urea reaction is applied in the units of layers and is configured to support through unreacted subject ink frozen into a gelled solid on the build platform.

Advantageous Effects

In an inkjet-type 3D printing method according to the present invention, by using, as the subject ink, a phase change ink composition ink that exists in a liquid phase at room temperature but is frozen and gelled at a certain temperature or lower, a separate supporter structure for supporting an overhang portion of a 3D structure to be printed during 3D printing can be omitted, so the waste of the ink composition consumed for printing the supporter may be eliminated and the post-processing process after printing may be simplified, thereby shortening the overall production process and lower the production cost of products.

In addition, according to the present invention, by spraying a hardener ink onto a surface of a subject ink applied in units of layers by an inkjet method to print a 3D structure through a urea reaction between the hardener ink and the subject ink, it is possible to print various types of large-area 3D structures regardless of a size of a printed matter and apply various types of high molecular oligomers or polymer compositions as the subject ink applied in units of layers, and by printing 3D structures through inkjet spraying of a relatively small amount of hardener ink, it is possible to provide a significantly improved printing speed compared to the conventional inkjet-type 3D printing process using photocuring or thermal curing.

BRIEF DESCRIPTION OF THE DRAWINGS

FIG. 1 is a diagram schematically illustrating an environment in which an inkjet-type 3D printing method according to the present invention is performed.

FIG. 2 is a graph illustrating, as an example, a change in viscosity according to a temperature of an ink composition used as a subject ink in the inkjet-type 3D printing method according to the present invention.

FIG. 3 is a diagram for explaining a process of printing a 3D structure through a urea reaction between the subject ink and the hardener ink in the inkjet-type 3D printing method according to the present invention.

BEST MODE

Hereinafter, a preferred embodiment of an inkjet-type 3D printing method according to the present invention described above will be described in more detail with reference to drawings.

Mode for Invention

FIG. 1 is a diagram schematically illustrating an environment in which an inkjet-type 3D printing method according to the present invention is performed.

As briefly described above, an inkjet-type 3D printing method according to the present invention takes a method of printing a 3D structure by spraying a hardener ink onto a surface of a subject ink applied in units of layers through an inkjet method to form a hardened structure through a urea reaction occurring between the subject ink and the hardener ink.

To this end, in the present invention, as illustrated in FIG. 1, a subject ink 500 for 3D printing through a slot coating unit 300 provided on an upper portion of the build platform 200 is applied in units of layers to a certain thickness on the build platform 200 formed of a slot die or the like.

In this case, the ink composition constituting the subject ink applied to the present invention has a liquid viscosity so that a single printing layer for 3D printing may be deposited on the build platform 200 at room temperature, and has a characteristic in which the viscosity rapidly increases at a low temperature equal to or lower than a certain temperature and undergoes a phase change to a gelled solid phase.

FIG. 2 is a graph showing, as an example, a change in viscosity according to the temperature of an ink composition for subject ink used in the 3D printing method according to the present invention. As illustrated in FIG. 2, the ink composition for subject ink exists as a liquid with a viscosity ranging from 50,000 to 5,000,000 cPs at a room temperature of about 20° C. However, it can be seen that the viscosity of the ink composition for subject ink rapidly increases as the temperature decreases and the ink composition for subject ink is phase-changed to a gelled solid with a viscosity of 500,000,000 cPs or more at 10° C. or lower.

In order to effectively utilize the phase change characteristics of the subject ink, the 3D printing method according to the present invention is performed in a low temperature chamber 100 in which a low temperature environment equal to or lower than the phase change temperature of the subject ink is maintained. To this end, a temperature control means (not illustrated) such as a cooling fan may be provided inside the low temperature chamber 100 so as to always maintain internal atmosphere to a certain temperature or lower.

In addition, a cooling means such as a cooling loop 800 is connected to the build platform 200 on which the subject ink is applied in units of layers and sequentially stacked so that a surface temperature of the build platform 200 is always maintained to a certain temperature or lower.

In this case, the slot coating unit 300 receives a liquid subject ink at room temperature through an ink supply line (not illustrated) or the like and applies the received liquid subject ink to a printed area on the build platform 200 in units of layers, and depending on the surface temperature of the build platform maintained at the phase change temperature or lower and the atmospheric environment inside the low temperature chamber 100, the applied subject ink is frozen into a gelled solid immediately after applied to form a printed matter block, thereby serving to support a 3D printed matter 700 that is cured and produced by the urea reaction described later.

Here, the surface temperature of the above-described build platform 200 or the atmospheric temperature in the low temperature chamber 100 may be appropriately adjusted according to the phase change temperature of the subject ink applied to the embodiment, and are preferably maintained in the range of 0° C. to 10° C.

In addition, the subject ink used in the 3D printing method according to the present invention, which is, as an ink composition having the above-described phase change characteristics, a high-molecular oligomer or a high-molecular polymer containing at least one isocyanate group (—NCO) or amine group (—$NH_2$) in its molecular structure, contains at least one amine group (—$NH_2$) or isocyanate group (—NCO) correspondingly, and forms a 3D structure by curing through a urea reaction with a hardener ink made of a monomer or oligomer having a viscosity of 500 cPs or less to enable inkjet jetting, which will be described in more detail with reference to FIG. 3 to be described later.

As described above, after the subject ink 500 is applied in units of layers to a certain thickness on the build platform 200, a printed matter layer is formed by selectively curing the applied subject ink 500 by spraying a hardener ink 600 through the inkjet printer 400 provided on the upper portion of the build platform 200 according to patterns set for each layer according to the shape of the 3D structure to be manufactured.

Thereafter, when the 3D printing of one layer is completed through the above-described process, the 3D printed matter is produced by repeatedly performing the process of applying the subject ink 500 in units of layers to a certain thickness on the printed layer and spraying the hardener ink to the applied subject ink again. In this way, during the production of the 3D printed matter, which is performed while sequentially stacked in units of layers through the application of the subject ink and the spraying of the hardener ink, as described above, the subject ink gelled and frozen on the build platform while the hardener ink is not sprayed but applied is already in a state close to a solid with no fluidity at all, and thus, the subject ink itself serves as a supporter for supporting a 3D printed matter 700 that is cured by the urea reaction and forms a printed matter block.

As described above, in the 3D printing method according to the present invention, by using, as the subject ink, an ink composition ink having phase change characteristics that exists in a liquid phase at room temperature but is frozen and gelled at a certain temperature or lower, a separate supporter structure for supporting an overhang portion of a 3D structure to be printed during 3D printing can be omitted, so the waste of the ink composition consumed for printing the supporter may be eliminated and the post-processing process after printing may be simplified, thereby shortening the overall production process and lower the production cost of products.

FIG. 3 is a diagram for explaining a process of printing a 3D structure through a urea reaction between the subject ink and the hardener ink in the inkjet-type 3D printing method according to the present invention.

As illustrated in the drawing, in the inkjet-type 3D printing method according to the present invention, by applying the subject ink 500 in units of layers on the build platform 200 and spraying the hardener ink 600 onto the subject ink 500 applied in this way according to the patterns set for each layer according to the shape of the 3D structure to be printed, a 3D printed matter 700 that is solidly hardened is printed through the urea linkage caused by the urea reaction between the sprayed hardener ink and the subject ink.

As shown in [Formula 1] below, the urea reaction refers to a chemical reaction in which the amine and isocyanate are mutually linked through the urea linkage to form polyurea, and such a urea reaction is a reaction that proceeds actively at a very high speed without a special catalyst for reaction initiation or separate reaction initiation energy.

[Formula 1]

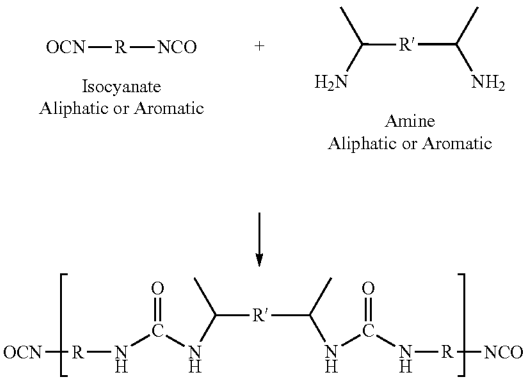

Isocyanate Aliphatic or Aromatic

Amine Aliphatic or Aromatic

Polyurea

In this way, in order to form the hardened structure through the urea reaction occurring between the subject ink and the hardener ink, in the present invention, in selecting the ink composition for the subject ink, the high-molecular oligomer or the high-molecular polymer containing at least one isocyanate group (—NCO) or amine group (—$NH_2$) in its molecular structure is used, and contrary to the subject ink, as the hardener ink used together therewith, the monomer or oligomer containing an amine group (—$NH_2$) or an isocyanate group (—NCO) is used.

That is, in the present invention, as illustrated in FIG. 3, first, the subject ink 500 is applied in units of layers on the build platform 200, and the hardener ink 600 is sprayed onto the subject ink 500 applied in this way according to the patterns set for each layer according to the shape of the 3D structure to be printed. In this case, the subject ink 500 contains a reactive group of one of an isocyanate group (—NCO) or an amine group (—$NH_2$), and contrary to the subject ink, the hardener ink 600 sprayed thereonto contains an amine group (—$NH_2$) or an isocyanate group (—NCO), and thus, in the area where the hardener ink 600 is sprayed according to the patterns set for each layer, the urea reaction proceeds between the sprayed hardener ink and subject ink to implement the cross-linking, so the 3D printed matter 700 having the solidly cured polyurea structure is formed through the urea linkage.

In this case, the urea reaction occurring between the hardener ink and the subject ink is an exothermic reaction accompanied by reaction heat, and as illustrated in the drawing, the heat generated through the urea reaction on the surface of the applied subject ink melts an unreacted solidified subject ink at the bottom and changes the unreacted solidified subject ink into a liquid phase to diffuse the sprayed hardener ink to the bottom, so the reaction continues until all of the sprayed hardener ink reacts.

Here, as described above, the hardener ink applied to the present invention is composed of a monomer or oligomer having a viscosity of 500 cPs or less so that inkjet jetting may be easily performed. In this case, as described above, in order to effectively overcome the limitation according to the ejection speed of the ink composition ejected through the inkjet nozzle, it is necessary to minimize the amount of sprayed hardener ink within a possible range. To this end, in the present invention, by reducing the amount of hardener ink to the range of 1/20 to 1/5 of the volume of the subject ink applied in units of layers in the area where the hardener ink is sprayed, thereby effectively improving the printing speed of the entire 3D printing process.

That is, the relative amount of the subject ink and the hardener ink applied to the present invention is eventually determined by a mole ratio of the amine group and the isocyanate group contained in two ink compositions. According to the present invention, a high-molecule oligomer or a high-molecule polymer, which has the low-temperature phase change characteristics described above and has a molecular weight of 1,000 or more, is used as the subject ink, but a monomer or an oligomer, which has a molecular weight and viscosity much smaller than that, is used as the hardener ink, so the amount of hardener ink sprayed through the inkjet nozzle may be minimized, thereby greatly improving the entire printing speed.

In other words, in the inkjet-type 3D printing method according to the present invention, the polymer oligomer or polymer having phase change characteristics, which exists in a liquid phase at room temperature but is frozen and gelled at a certain temperature or lower, is used as the subject ink, is used as the subject ink and is applied in units of layers on the build platform through the slot coating unit, and a relatively small amount of hardener ink is sprayed through then inkjet nozzle on the surface of the subject ink applied in units of layers according to the patterns set for each layer, and the subject ink is cured through the urea reaction between the subject ink and the hardener ink, so, through a method of driving inkjet nozzles using a 2-D actuator, it is possible to minimize the amount of hardener ink sprayed through the inkjet nozzle for the production of 3D structures while maintaining the advantages of the inkjet printing, which may more freely print various types of large-area 3D structures regardless of the size of the printed matter, and it is possible to implement relatively fast printing speed by effectively overcoming the printing speed limitation according to the ejection speed of the ink composition sprayed through the inkjet nozzle.

In addition, unlike the conventional inkjet-type 3D printing process using photocuring or thermal curing, various types of oligomer or polymer compositions having a high molecular weight may be used as the printing material by using subject ink applied in units of layers on the build platform through the slot coating unit, and as described above, by printing the 3D structure using an ink composition that exists in a liquid phase at room temperature but is frozen and gelled at a certain temperature or lower as the subject ink, it is possible to omit the separate supporter structure for supporting the overhang portion of the 3D structure to be printed in the 3D printing process.

Furthermore, in the inkjet-type 3D printing method according to the present invention, among the hardener inks that are sprayed onto the surface of the subject ink and cross-linked through the urea reaction with the subject ink and cured, by supporting the interlayer bonding force of the 3D printed matters that are formed by being continuously stacked in units of layers through the process in which a small amount of hardener ink remaining on the surface without reacting with the subject ink reacts with the lower surface of the subject ink of the subsequent layer applied sequentially and is cured, the 3D printed matter produced by the conventional SLA or SLS 3D printing process has excellent connection strength in plan view, but there is the advantage of effectively reinforcing the problem of relatively weak connection strength between the printed layers.

Ink compositions for subject ink having an amine reactive group or an isocyanate reactive group applied to the present invention may be synthesized through various methods.

For example, when m+1 mol of a monomer or a prepolymer having an amine group ($—NH_2$) at both ends and m mol of a monomer or a prepolymer having an isocyanate group (—NCO) at both ends are linked through the urea reaction, the ink compositions for subject ink having the amine reactive group at both ends may be synthesized. In this case, the polymer oligomer or polymer having molecular weight and phase change characteristics suitable for the present invention may be synthesized by adjusting the component and synthesis ratio of the monomer or prepolymer used in the synthesis.

Also, in a similar manner, this time, when m+1 mole of monomer or prepolymer having an isocyanate group (—NCO) at both ends and m mole of monomer or prepolymer having an amine group ($—NH_2$) at both ends are linked through the urea reaction, it is possible to synthesize the ink compositions for subject ink having an isocyanate reactive group at both ends. In addition, m+1 mole of monomer or prepolymer having an isocyanate group (—NCO) at both ends and m mole of monomer or prepolymer having a hydroxyl group (—OH) at both ends may be linked through the urethane reaction, so the ink compositions for subject ink having an isocyanate reactive group at both ends may be synthesized.

In addition, as described above, the subject ink may contain an ink composition having an amine group ($—NH_2$) or an isocyanate group (—NCO) on at least one end, an inorganic filler to increase a modulus of an output, a colorant to implement color, and other various functional additives.

As the hardener ink, various commercially available monomers having an amine reactive group or an isocyanate reactive group may be used.

Examples of monomers having an amine reactive group may include dipropylene triamine, diethylene triamine, N,N-bis-(3-aminopropyl)ethylenediamine, methyl-diaminocyclohexane, isophorone diamine, 4,4-methylenebis(cyclohexylamine), 3,3-dimethyl-4,4-diaminocycloheylmethane, 4,7,10, trioxatridecane-1,13-diamine, 4,9-dioxadodecane-1, 12-diamine, polyetheramine, and the like.

Examples of the monomer having an isocyanate reactive group may include hexamethylene diisocyanate (HMDI), diphenyl methane diisocyanate (MDI), toluene diisocyanate (TDI), p-phenylene diisocyanate (PDI), isophorone diisocyanate (IPDI), and the like, and hexamethylene diisocyanate trimer or tir(4-isocyanatopheny)methane, and the like may be used in combination therewith.

In addition, it goes without saying that various functional additives such as an antioxidant, a leveling agent, and a surface modifier may be contained in the above-described hardener ink.

The embodiments of the present invention described above only show some examples of preferred embodiments of the present invention, and the present invention is not limited thereto, and the scope of protection of the present invention is limited by the matters described in the claims below. In addition, it is natural for those skilled in the art to implement various modifications without changing the subject matter of the present invention claimed in the claims, and therefore, such modifications or improvements will fall within the scope of the present invention as long as they are within the scope of matters obvious to those skilled in the art to which the present invention belongs.

| <Detailed Description of Main Elements> |
| --- |
| 100: Low temperature chamber |
| 200: Build platform |
| 300: Slot coating unit |
| 400: Inkjet printer |
| 500: Subject ink |
| 600: Hardener ink |
| 700: 3D printed matter |
| 800: Cooling loop |

INDUSTRIAL APPLICABILITY

As described above, in an inkjet-type 3D printing method according to the present invention, by providing a method of printing a 3D structure through a urea reaction between a subject ink applied in units of layers on a build platform through a slot coating unit and a hardener ink sprayed through an inkjet nozzle on a surface of the subject ink applied in units of layers, it is possible to use various kinds of oligomer or polymer compositions having a high molecular weight of 1,000 Mw (g/mole) or more as a printing material, more freely print various types of large-area 3D structures regardless of a size of a printed matter by supporting printing of a 3D structure by spraying a small amount of hardener ink having a low viscosity of 500 cPs or less which is easy to inkjet spraying, and realize a relatively fast printing speed by effectively overcoming a printing speed limitation according to an ejection speed of an ink composition sprayed through the inkjet nozzle by minimizing the ejection amount of the hardener ink sprayed through the inkjet nozzle for the production of the 3D structures.

In addition, by printing a 3D structure using, as a subject ink, a high-molecular oligomer or a high-molecular polymer having phase change characteristics that exists in a liquid phase at room temperature but is frozen and gelled at a certain temperature or lower, it is possible to omit a separate supporter structure for supporting an overhang portion of a 3D structure to be printed during 3D printing, and after the production of the printed matter is completed, the printed matter and the ink composition block stacked together with the printed matter are moved to a room temperature environment, left at room temperature, or weakly heated, so the gelled solid subject ink in an unreacted state other than the 3D printed matter cured by the urea reaction may be phase-changed to a liquid phase and recovered, purified again through a simple filtration process, and reused as the subject ink for 3D printing.

In addition, the obtained printed matter is dried after completely removing the uncured ink composition remaining on the surface of the printed matter through a washing process with a washing solution to complete the production. In this case, since the entire post-printing process is performed in a room temperature environment using a washing solution at room temperature, it is possible to minimize the configuration of additional equipment for the post-processing process and at the same time increase the convenience of performing the work.

The invention claimed is:

1. An inkjet-type three-dimensional (3D) printing method of printing a 3D structure using a urea reaction between amine and isocyanate, the inkjet-type 3D printing method comprising:

applying by a slot coating method a subject ink on a build platform to form a subject ink layer, the subject ink consisting of a high molecular weight oligomer or a high molecular weight polymer containing an amine group (—$NH_2$) or an isocyanate group (—NCO) on an least one end;

spraying a hardener ink, according to patterns set in advance for a shape of a 3D structure layer of the 3D structure to be manufactured, onto a surface of the subject ink layer through an inkjet nozzle, the hardener ink consisting of a monomer or an oligomer containing the other of the isocyanate group (—NCO) or the amine group (—$NH_2$) from that of the subject ink on at least one end and curing the 3D structure layer through cross-linking by the urea reaction between amine and isocyanate groups contained in the subject ink and the hardener ink, respectively; and repeatedly applying subsequent layers of the subject ink on the 3D structure layer previously cured by the urea reaction, and then curing the subsequently applied layers by spraying thereon the hardener ink through the inkjet nozzle, wherein the subject ink is made of a temperature phase change ink composition that is maintained in a liquid state at a temperature above the phase change temperature and is frozen and gelled at a temperature equal to or lower than the phase change temperature, the printing of the 3D structure is performed in a chamber in which the temperature is equal to or lower than the phase change temperature, using cooling means to maintain a surface temperature of the build platform in a range of 0° C. to 10° C.; and whereby each applied ink layer and the correspondingly sprayed hardener ink are supported by the prior layers of the 3D structure which are at a temperature below the phase change temperature.

2. The inkjet-type 3D printing method of claim 1, wherein the chamber is maintained in a temperature range of 0° C. to 10° C.

3. The inkjet-type 3D printing method of claim 1, wherein the subject ink applied in layers through the slot coating method is applied in the liquid state at a temperature above the phase change temperature of the subject ink and then frozen to a gelled solid on the build platform by cooling the layers of the subject ink to a temperature below the phase change temperature of the subject ink via the chamber.

4. The inkjet-type 3D printing method of claim 1, wherein the monomer or the oligomer of the hardener ink having a viscosity of 500 cPs or less.

5. The inkjet-type 3D printing method of claim 1, wherein the volume of the hardener ink sprayed onto the surface of the subject ink is 1/20 to 1/5 of the volume of the subject ink.

6. The inkjet-type 3D printing method of claim 1, wherein the high-molecular weight oligomer or the high-molecular weight polymer of the subject ink has a molecular weight of 1,000 Mw (g/mole) or more.

7. The inkjet-type 3D printing method of claim 1, wherein as the hardener ink, a monomer having an amine group (—$NH_2$) or an isocyanate group (—NCO) is used.

8. The inkjet-type 3D printing method of claim 1, wherein the subject ink includes an inorganic filler, a colorant, and at least one functional additive.

9. The inkjet-type 3D printing method of claim 1, wherein the hardener ink contains at least one functional additive containing an antioxidant, a leveling agent, or a surface modifier.

* * * * *